United States Patent
Kilian et al.

(10) Patent No.: US 10,212,683 B2
(45) Date of Patent: Feb. 19, 2019

(54) SYSTEM FOR ALLOWING REGISTRATION OF DECT DEVICES

(71) Applicant: DSP Group LTD., Herzeliya (IL)

(72) Inventors: Jochen Kilian, Rothenburg ob der Tauber (DE); Otmar Rengert, Nuremberg (DE)

(73) Assignee: DSP GROUP LTD., Herzliya (IL)

( * ) Notice: Subject to any disclaimer, the term of this patent is extended or adjusted under 35 U.S.C. 154(b) by 0 days.

(21) Appl. No.: 13/792,473

(22) Filed: Mar. 11, 2013

(65) Prior Publication Data

US 2014/0094170 A1   Apr. 3, 2014

Related U.S. Application Data

(60) Provisional application No. 61/610,044, filed on Mar. 13, 2012.

(51) Int. Cl.
*H04W 60/00* (2009.01)
*H04M 1/727* (2006.01)

(52) U.S. Cl.
CPC ............ *H04W 60/00* (2013.01); *H04M 1/727* (2013.01); *H04M 2250/08* (2013.01)

(58) Field of Classification Search
CPC ..... H04W 60/00; H04W 12/06; H04W 48/08; H04M 2250/08
USPC ...................................................... 455/435.1
See application file for complete search history.

(56) References Cited

U.S. PATENT DOCUMENTS

| | | | | |
|---|---|---|---|---|
| 6,259,279 B1 * | 7/2001 | Galbraith | ................... | G06F 1/04 327/39 |
| 6,826,401 B1 * | 11/2004 | Morvan et al. | ............. | 455/435.1 |
| 2005/0086366 A1 * | 4/2005 | Luebke et al. | ................. | 709/238 |
| 2011/0138294 A1 * | 6/2011 | Jeon | ........................ | G06Q 10/10 715/739 |

FOREIGN PATENT DOCUMENTS

DE        102007023022 A1 *  11/2008  ............ H04W 12/06

* cited by examiner

*Primary Examiner* — Gary Lafontant
(74) *Attorney, Agent, or Firm* — Reches Patents

(57) ABSTRACT

A system may be provided and may include a trusted DECT device; and a DECT base station; wherein the trusted DECT device is arranged to send, to the DECT base station, registration allowable DECT device credentials; wherein the DECT base station is arranged to: receive from a requesting DECT device a request for registration of the requesting DECT device to the DECT base station; wherein the request comprises requesting DECT device credentials; register the requesting DECT device to the DECT base station if the requesting DECT device credentials match the registration allowable DECT device credentials; and prevent a registration of the requesting DECT device to the DECT base station if the requesting DECT device credentials differ from the registration allowable DECT device credentials.

23 Claims, 7 Drawing Sheets

SYSTEM FOR ALLOWING REGISTRATION OF DECT DEVICES

RELATED APPLICATIONS

This application claims the priority of U.S. provisional patent 61/610,044 filing date Mar. 13, 2012 which is incorporated herein by reference.

BACKGROUND OF THE INVENTION

Digital Enhanced Cordless Telecommunications (DECT) is currently mainly used for telephony only. Where the mobile devices (DECT handsets) are telephones with at least a keyboard and in most of the cases a display.

In order to facilitate communication between a DECT handset and a DECT base station the DECT Handset needs to be registered at the DECT base station.

The registration for a DECT handset is done by bringing the DECT base station into registration mode and by keying in a PIN into the DECT handset.

DECT Ultra low Energy (ULE) standard allows low energy communication between DECT devices.

With DECT ULE more and more non-telephony DECT devices need to be registered to the DECT base station, like smoke detectors, motion detectors, glass break sensors and alike.

DECT today has either the regular authentication with help of the PIN which needs always being entered at the "to be registered" device Cordless Advanced Technology—internet and quality (CAT-iq) introduced a simple pairing method, where the PIN is always assumed to be a well-known number (0000). But one can imagine this is not really save In Wifi there is a mechanism of easy pairing by pressing a key at the DECT base station and initiating the pairing only after the key press.

It is important to provide the end user a simple way to register new devices into the DECT ULE Home Automation (HA) network. But these new DECT devices often have no keyboard to type in a Pin. The challenge is now to provide a secure and simple registration of new DECT devices.

SUMMARY OF THE INVENTION

According to various embodiments of the invention there may be provided a system that may include a trusted Digital Enhanced Cordless Telecommunications (DECT) device; and a DECT base station; wherein the trusted DECT device may be arranged to send, to the DECT base station, registration allowable DECT device credentials; wherein the DECT base station may be arranged to: receive from a requesting DECT device a request for registration of the requesting DECT device to the DECT base station; wherein the request comprises requesting DECT device credentials; register the requesting DECT device to the DECT base station if the requesting DECT device credentials match the registration allowable DECT device credentials; and prevent a registration of the requesting DECT device to the DECT base station if the requesting DECT device credentials differ from the registration allowable DECT device credentials.

The trusted DECT device may be a DECT mobile phone that is registered to the DECT base station.

The trusted DECT device may be a plug-in DECT device that is coupled to the DECT base station.

The DECT base station may be arranged to register the requesting DECT device to the DECT base station if (a) the requesting DECT device credentials match the registration allowable DECT device credentials and (b) the requesting DECT device credentials are received by the DECT base station during a time window.

The time window may start after a predetermined period after at least one of (a) a locking of the requesting DECT device to the DECT base station, (b) a user response that is triggered by the locking of the requesting DECT device to the DECT base station.

The DECT base station may be arranged to register the requesting DECT device to the DECT base station if (a) the requesting DECT device credentials match the registration allowable DECT device credentials, (b) the requesting DECT device credentials are received by the DECT base station during a time window, and (c) the DECT base station receives the registration allowable DECT device credentials after at least one of (i) a locking of the requesting DECT device to the DECT base station, and (ii) a user response that is triggered by the locking of the requesting DECT device to the DECT base station.

The system may include the requesting DECT device, wherein the requesting device may be arranged to generate an alert indicative of the locking of the requesting DECT device to the DECT base station.

The length of the time window may be relatively short 5, 10, 15, 20, 30, 40, 60 seconds and the like.

The trusted DECT device may be arranged to send, to the DECT base station, the registration allowable DECT device credentials in response to reception of a trigger provided to the trusted DECT device from a user.

The trusted DECT device may be arranged to send, to the DECT base station, the registration allowable DECT device credentials in response to out of band feedback provided to the trusted DECT device from a user.

The DECT base station may be arranged to transmit a registration mode indicator in response to a reception of the registration allowable DECT device credentials.

The trusted DECT device may be arranged to send, to the DECT base station, registration allowable DECT devices credentials associated with multiple DECT devices that should be registered by the DECT base station; and wherein the DECT base station may be arranged to: register the requesting DECT device to the DECT base station if the requesting DECT device credentials match one of the registration allowable DECT devices credentials; and prevent the registration of the requesting DECT device to the DECT base station if the requesting DECT device credentials differs from each one of the registration allowable DECT devices credentials.

There may be provided a system that may include a trusted Digital Enhanced Cordless Telecommunications (DECT) device; and a DECT base station. The DECT base station may be arranged to: receive from a requesting DECT device a request for registration of the requesting DECT device to the DECT base station; wherein the request comprises requesting DECT device credentials; and send to the trusted DECT device the requesting DECT device credentials. The trusted DECT device may be arranged to send to the DECT base station a confirmation message if it is determined to allow the requesting DECT device to register to the DECT base station. The DECT base station may be arranged to register the requesting DECT device to the DECT base station in response to a reception of a confirmation message and to prevent a registration of the requesting DECT device to the DECT base station at an absence of a reception of the confirmation message.

The trusted DECT device may be arranged to determine whether to allow the requesting DECT device to register to the DECT base station.

The trusted DECT device may be arranged to receive from a user information indicative of whether to allow the requesting DECT device to register to the DECT base station.

There may be provided a method that may include sending, to a Digital Enhanced Cordless Telecommunications (DECT) DECT base station from a trusted DECT device, registration allowable DECT device credentials; receiving from a requesting DECT device a request for registration of the requesting DECT device to the DECT base station; wherein the request comprises requesting DECT device credentials; registering the requesting DECT device to the DECT base station if the requesting DECT device credentials match the registration allowable DECT device credentials; and preventing a registration of the requesting DECT device to the DECT base station if the requesting DECT device credentials differ from the registration allowable DECT device credentials.

Any combinations of any of the components of any of the figures can be provided. Any combination of any of the mentioned above systems can be provided.

Any reference to a system should be applicable to a reference to a system that can be executed by the system. Any reference to a method should be applicable to a system capable of executing the method.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
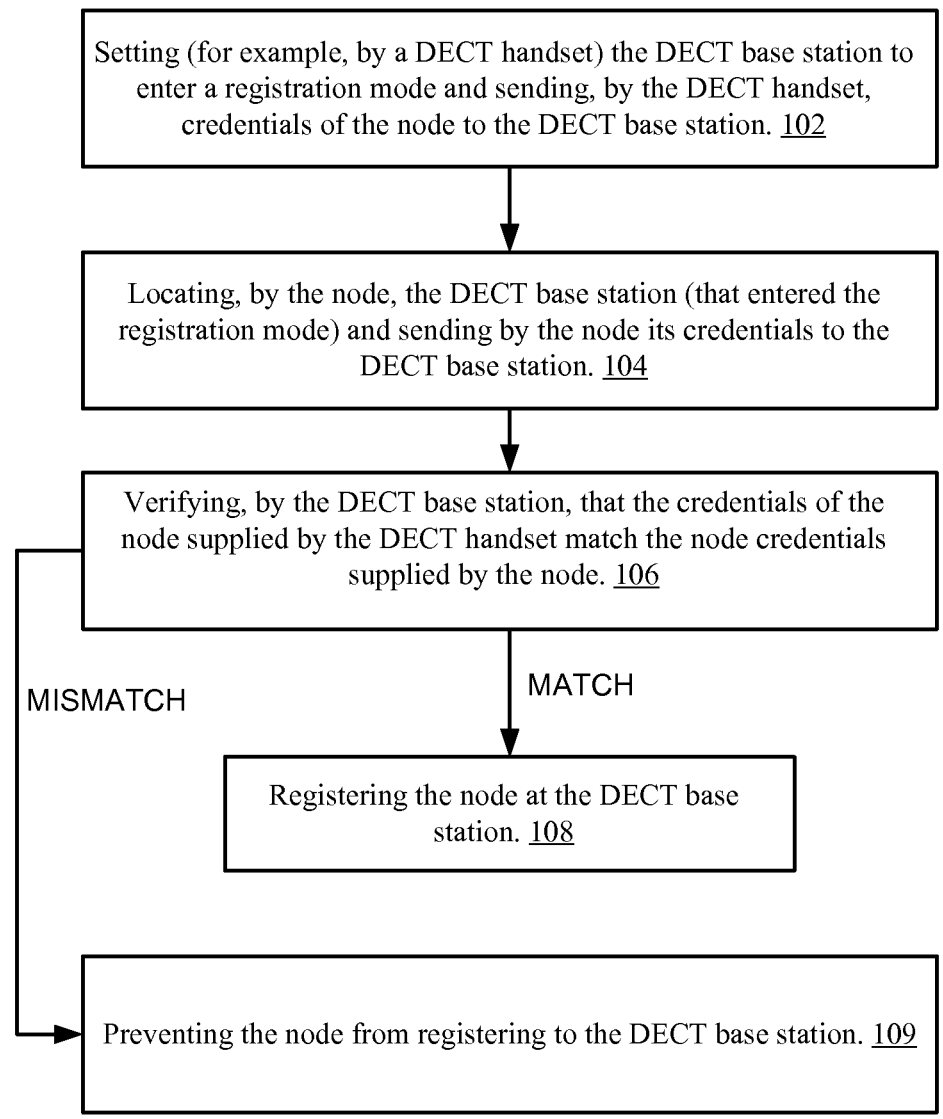
FIG. 1 illustrates a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may, for the most part, be implemented using electronic components and modules known to those skilled in the art, details will not be explained in any greater extent than that considered necessary as illustrated above, for the understanding and appreciation of the underlying concepts of the present invention and in order not to obfuscate or distract from the teachings of the present invention.

According to various embodiments of the invention there are provided systems for registering DECT devices to a DECT base station. The registration allows the DECT base station and (registered) DECT devices to communicate with each other. The registration can be facilitates by using a trusted DECT device that may provide to the DECT base station information about DECT devices that should be registered to the DECT base station. The registration process may require verification from a user, via out-of-band channels. This verification or feedback can allow electing which DECT devices should be registers. This feature allows a user to elect which DECT devices out of multiple DECT devices that can communicate with the DECT base station should actually be registered. This selection can be beneficial when there are multiple DECT devices that can be communicate with the DECT base station but only some should be allowed to communicate with the DECT base station.

DECT devices (including DECT ULE devices) can be registered in a simple manner by using a trusted DECT device to verify the credentials of the DECT devices to be registered to the DECT base station. For example, a DECT base station is a DECT base station that is DECT compliant (it may be compliant to any DECT version or variant including, for example DECT ULE).

The trusted DECT device (also referred to as a trusted source) can be a standard DECT Handset which is already successfully registered to the DECT base station, can be a plug-in device such as a Universal Serial Bus (USB) dongle connected to the DECT base station or a USB dongle connected to a HA controller that belongs to the same HA as the DECT base station. It is noted that the plug-in device can be connected via an interface that differs from USB compliant connection.

In the following figures it is assumed that the trusted DECT device is a DECT handset and that a DECT device that requests to be registered to the DECT base station (requesting DECT device) is a node. The node can be a DECT device that differs from the trusted DECT device and from the DECT base station. The node can be a sensor, can be ULE DECT compliant or not.

FIG. 1 illustrates method 100 according to an embodiment of the invention.

Method 100 starts by stage 102 of setting (for example, by a DECT handset) the DECT base station to enter a registration mode and sending, by the DECT handset, credentials of the node to the DECT base station.

Stage 102 may be followed by stage 104 of locating, by the node, the DECT base station (that entered the registration mode) and sending by the node its credentials to the DECT base station. The node may be powered up after the completion of stage 102.

Stage 104 may be followed by stage 106 of verifying, by the DECT base station, that the credentials of the node supplied by the DECT handset match the node credentials supplied by the node.

If the verification succeeds (there is a match) then stage 106 may be followed by stage 108 of registering the node at the DECT base station. Else (mismatch) stage 106 may be followed by stage 109 of preventing the node from registering to the DECT base station.

Figure 2:
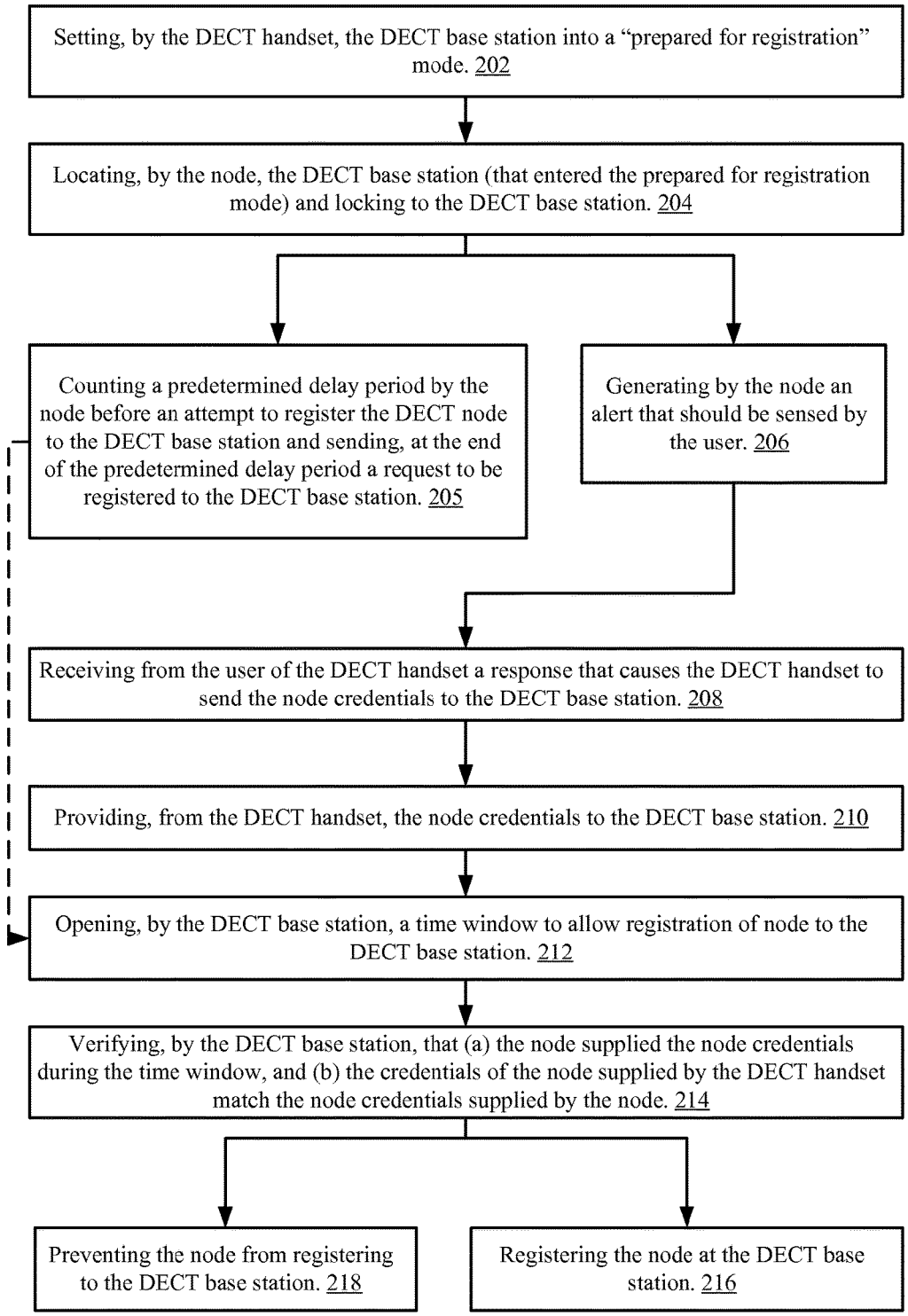
FIG. 2 illustrates a method according to an embodiment of the invention.

FIG. 2 illustrated method 200 according to an embodiment of the invention.

Method 200 may start by stage 202 of setting, by the DECT handset, the DECT base station into a "prepared for registration" mode.

Stage 202 may be followed by stage 204 of locating, by the node, the DECT base station (that entered the prepared for registration mode) and locking to the DECT base station (the node found the DECT base station and listens to the DECT base station beacon—but does not attempt to register to the DECT base station).

Stage 204 may be followed by stages 205 and 206.

Stage 205 includes counting a predetermined delay period by the node before an attempt to register the DECT node to the DECT base station. At the end of the predetermined delay period the DECT node sends a request to be registered to the DECT base station. The request includes the node credentials.

Stage 206 may include generating by the node an alert that should be sensed by the user. The alert can be visual or acoustical (vocal). According to an embodiment of the alert of the node is indicative of the duration of the delay.

Stage 206 may be followed (if the user of the DECT handset chooses to provide input) by stage 208 of receiving from the user of the DECT handset a response that causes the DECT handset to send the node credentials to the DECT base station. The user is aware of the predetermined delay and that he should trigger the transmission of the credentials of the node from the DECT handset to the DECT base station during the predetermined delay or even after the time window starts—but before the time window begins. The response of the user can start the count of the predetermined delay. The response can include a provision of a response indication (the user may press a key, provide a vocal command, contact a touch screen) and a provision of the node credentials. The provision of the response indication and/or the node credentials can be made by using non-DECT (out of band) communication channels.

The user is informed in advance that his response is expected to be provided within a certain delay from the reception of the alert from the node.

Stage 208 may be followed by stage 210 of providing, from the DECT handset, the node credentials to the DECT base station.

Stage 210 may be followed by stage 212 of opening, by the DECT base station, a time window to allow registration of node to the DECT base station.

Stage 212 may be followed by stage 214 of verifying, by the DECT base station, that (a) the node supplied the node credentials during the time window, and (b) the credentials of the node supplied by the DECT handset match the node credentials supplied by the node.

If the verification succeeds (there is a match) then stage 214 may be followed by stage 216 of registering the node at the DECT base station. Else (mismatch) stage 214 may be followed by stage 218 of preventing the node from registering to the DECT base station.

Method 200 uses a certifying device (trusted DECT device such as a DECT handset) to enter an identification code of the node (for example an IPEI or ID).

Method 200 uses an out of band feedback loop for the user to verify the right node is certified/registered.

Method 200 uses a certifying device to confirm the correct node provided out of band feedback.

The Base compares provided credentials and grants registration (or not)

The DECT base station may be opened only for a short period of time for real registration.

The out of band feedback may ensure high security.

The node credentials can be sent in an encrypted form (IPEI will not be send as plain text then).

A non-limiting scenario that utilized method 200 is provided below:

1. A user wants to register a new DECT burglar alarm device to a DECT base station, and tries to prevent a foreign device from registered to the DECT base station (by some potential criminal that is spying after the DECT base station and wants to intrude the security system of the user with his own alarm device. It may be assumes that this criminal somehow got notice out the new burglar alarms credentials)
2. The user prepares the DECT base station for registration using the trusted DECT device (the DECT base station may transmit some information that it is ready for this). At that stage the DECT base station is prepared for registration, but it would not yet allow new devices to register
3. The user switches his new burglar alarm device (node).
4. The burglar alarm device scans its DECT environment, and locks to the DECT base station (because this is the one open for registration). It then 'Locks' to the DECT base station (it is now listens to the DECT base station, but not yet talking to the base).
5. At that moment the new burglar alarm would give some indication to the user, e.g. a LED would be steady on, or it would beep. And also at that moment there is a countdown (delay of X) started in the new burglar alarm after which it would try to register. This time X could for example be 5 seconds.
6. Now the user sees (or hears) this indication of the new burglar alarm, and triggers the DECT base station to allow new registrations for a time Y of say 10 seconds.
7. When the timer X started at step 3 expires, the new burglar alarm tries to register with the DECT base station, and meets the allowable time Y=>success!

If a criminal would want to subscribe his own DECT device to that DECT base station, it would not know about the time window Y, and cannot subscribe successfully.

This time window gives additional security on top of the burglar alarm device credentials being submitted to the base before.

Figure 3:
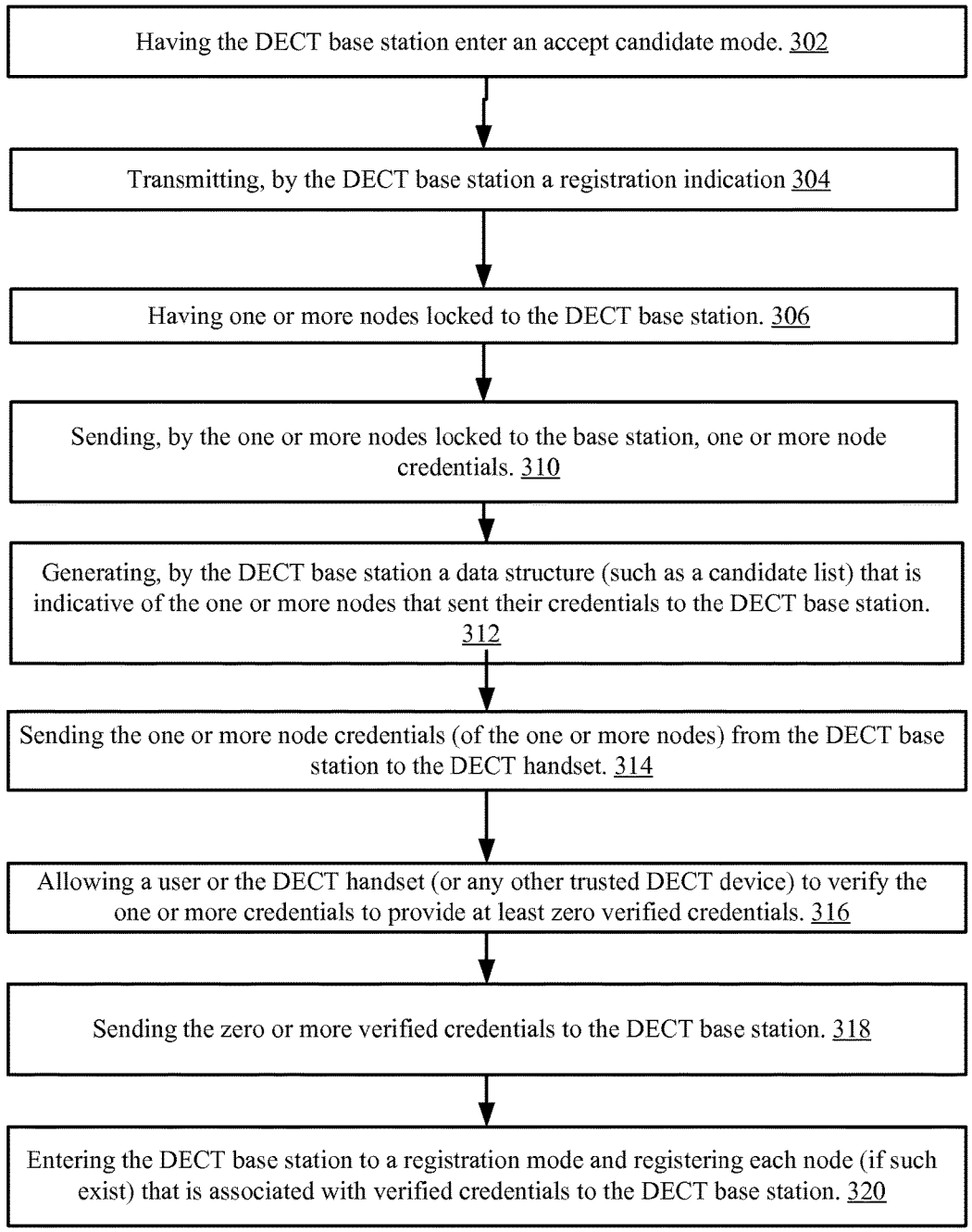
FIG. 3 illustrates a method according to an embodiment of the invention.

FIG. 3 illustrates a method 300 according to an embodiment of the invention.

Method 300 may start by stage 302 of having the DECT base station enter an accept candidate mode. The DECT base station can be brought to that mode by the DECT handset, by the user and the like.

Stage 302 may be followed by stage 304 of transmitting, by the DECT base station a registration indication (for example—a specific indication).

Stage 306 may be followed by stage 308 of having one or more nodes locked to the DECT base station.

Stage 310 may be followed by stage 310 of sending, by the one or more nodes locked to the DECT base station, one or more node credentials.

Stage 310 may be followed by stage 312 of generating, by the DECT base station a data structure (such as a candidate list) that is indicative of the one or more nodes that sent their credentials to the DECT base station.

Stage 312 may be followed by stage 314 of sending the one or more node credentials (of the one or more nodes) from the DECT base station to the DECT handset.

Stage 314 may be followed by stage 316 of allowing a user or the DECT handset (or any other trusted DECT device) to verify the one or more credentials to provide at least zero verified credentials. (Zero verified credentials are generated if all nodes should not be registered to the DECT base station).

Stage 316 may be followed by stage 318 of sending the zero or more verified credentials to the DECT base station.

Stage 318 may be followed by stage 320 of entering the DECT base station to a registration mode and registering each one of the nodes (if such exist) that is associated with verified credentials to register to the DECT base station.

Method 300 can be executed with or without out of band feedback.

Figure 4:
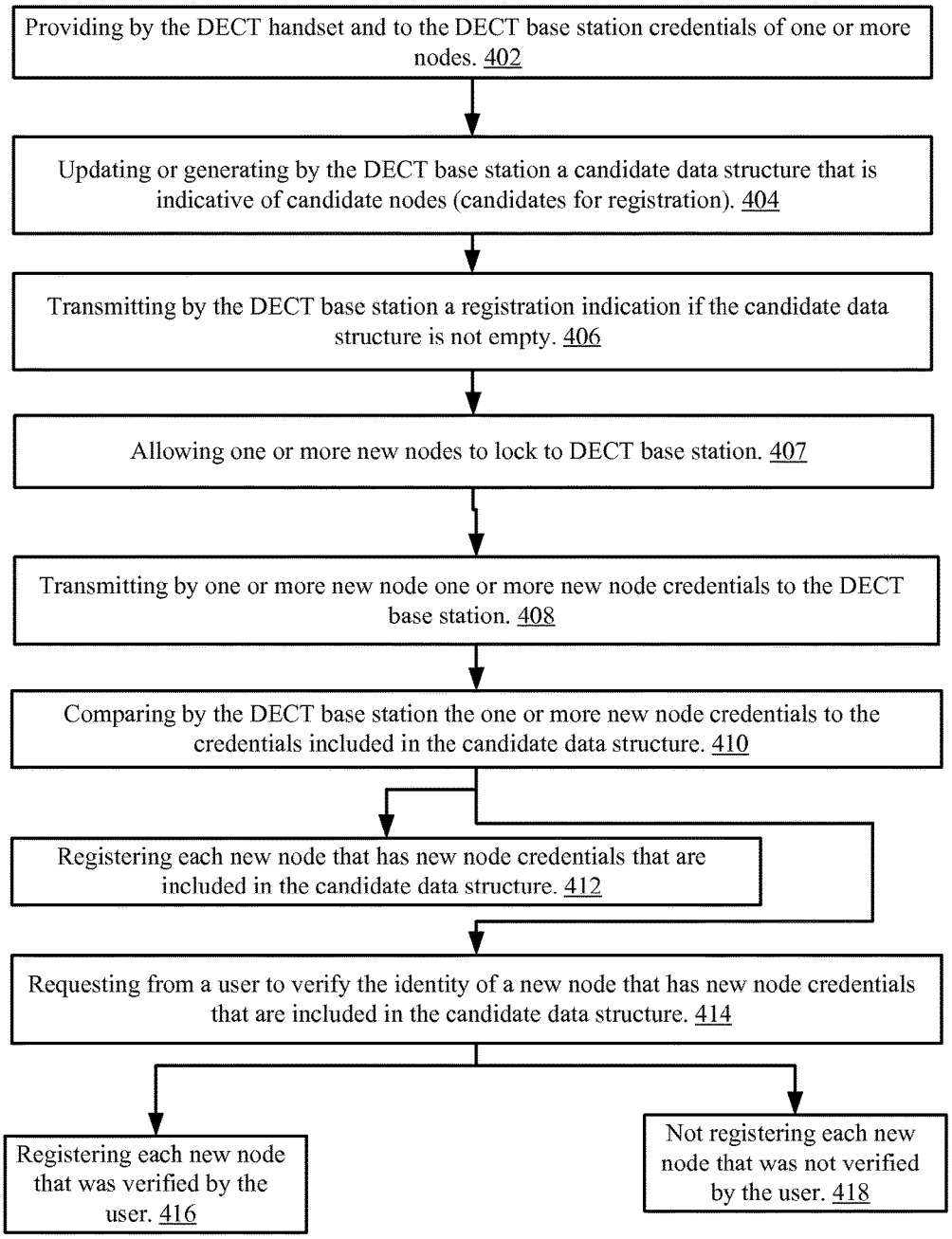
FIG. 4 illustrates a method according to an embodiment of the invention.

FIG. 4 illustrates a method 400 according to an embodiment of the invention.

Method 400 may start by stage 402 of providing by the DECT handset and to the DECT base station credentials of one or more nodes.

Stage 402 may be followed by stage 404 of updating or generating by the DECT base station a candidate data structure that is indicative of candidate nodes (candidates for registration).

Stage 404 may be followed by stage 406 of transmitting by the DECT base station a registration indication (a specific indication) if the candidate data structure is not empty.

Stage 406 may be followed by stage 407 of allowing one or more new nodes to lock to DECT base station.

Stage 407 may be followed by stage 408 of transmitting by one or more new node one or more new node credentials to the DECT base station.

Stage 408 may be followed by stage 410 of comparing by the DECT base station the one or more new node credentials to the credentials included in the candidate data structure.

Stage 410 may be followed by stage 412 of registering each new node that has new node credentials that are included in the candidate data structure.

Stage 410 may be followed by stage 414 of requesting from a user to verify the identity of a new node that has new node credentials that are included in the candidate data structure.

Stage 414 may be followed by stage 416 of registering each new node that was verified by the user.

Stage 414 may be followed by stage 418 of not registering each new node that was not verified by the user.

Figure 5:
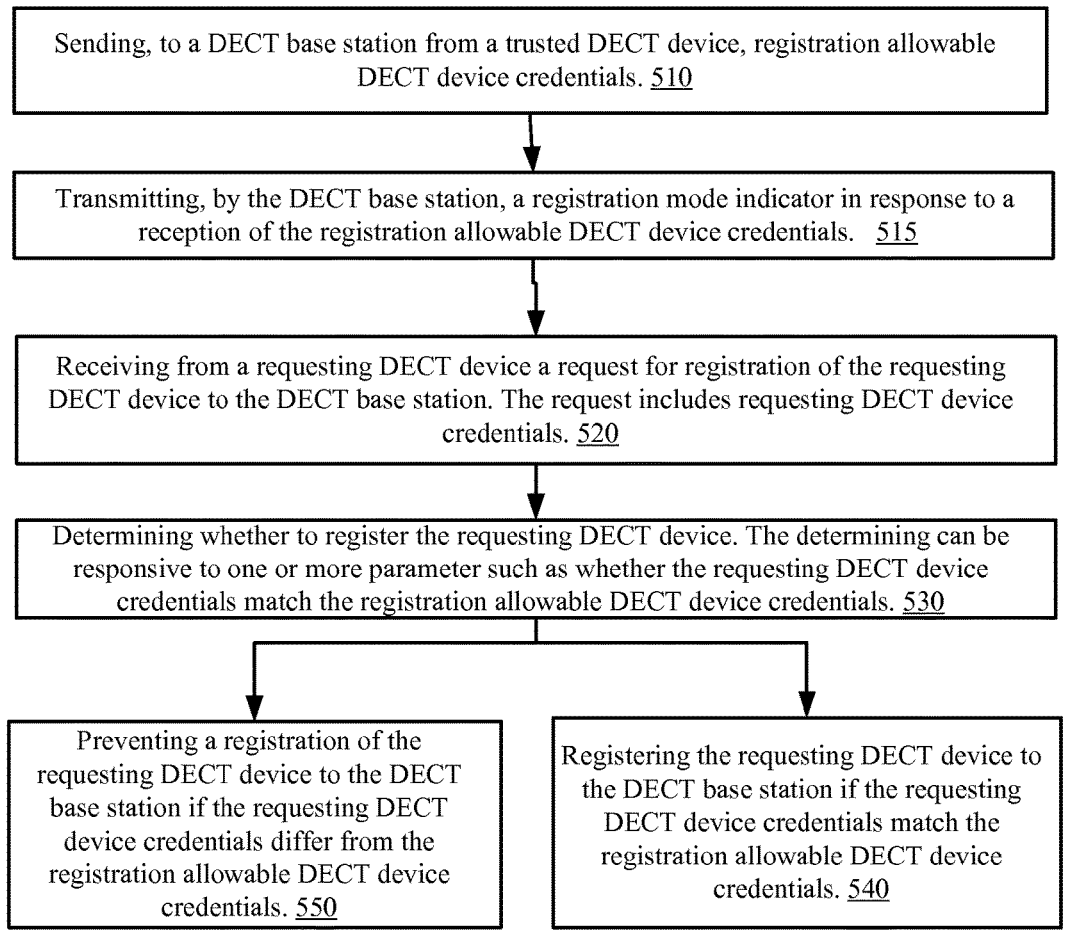
FIG. 5 illustrates a method according to an embodiment of the invention.

FIG. 5 illustrates method 500 according to an embodiment of the invention.

Method 500 may start by stage 510 of sending, to a Digital Enhanced Cordless Telecommunications (DECT) DECT base station from a trusted DECT device 110, registration allowable DECT device credentials.

Stage 510 may be triggered by a reception of a trigger provided to the trusted DECT device from a user.

Stage 510 may be triggered in response to out of band feedback provided to the trusted DECT device from a user.

Stage 510 may be followed by stages 515 or 520.

Stage 515 may include transmitting, by the DECT base station, a registration mode indicator in response to a reception of the registration allowable DECT device credentials. Stage 515 may be followed by stage 520.

Stage 520 may include receiving from a requesting DECT device a request for registration of the requesting DECT device to the DECT base station. The request includes requesting DECT device credentials.

Stage 520 may be followed by stage 530 of determining whether to register the requesting DECT device. The determining can be responsive to one or more parameter such as whether the requesting DECT device credentials match the registration allowable DECT device credentials.

Stage 530 may be followed by stage 540 of registering the requesting DECT device to the DECT base station if the requesting DECT device credentials match the registration allowable DECT device credentials.

Stage 530 may be followed by stage 550 of preventing a registration of the requesting DECT device to the DECT base station if the requesting DECT device 130 credentials differ from the registration allowable DECT device credentials.

The trusted DECT device may be a DECT mobile phone that is registered to the DECT base station, or a plug-in DECT device that is coupled to the DECT base station.

Stage 530 may include determining to register the requesting DECT device to the DECT base station if (a) the requesting DECT device credentials match the registration allowable DECT device credentials and (b) the requesting DECT device credentials are received by the DECT base station during a time window. The time window may start after a requesting DECT device locked to the DECT base station. Even if the DECT base station is unaware of the locking of the requesting DECT device it is assumed that the DECT base station is triggered (by a user or by the trusted DECT device) to open the time window. The delay between the locking of the requesting DECT device and the timing of the attempt of the registration by the requesting DECT device should be known to the user or to the trusted DECT device so that the registration attempt (the first registration attempt or any further registration attempt) of the requesting DECT device would fall within the time window. The expected duration of the delay can be communicated to the user or trusted DECT device in various manners—electronically or other. The user can receive such information from the manual of the requesting DECT device. Thus—the time window may start based on a signal which is send by the trusted DECT device to the DECT base station. The trusted DECT device sends this signal based on an input from the user Stage 530 may include determining to register the requesting DECT device to the DECT base station if (a) the requesting DECT device credentials match the registration allowable DECT device credentials, (b) the requesting DECT device credentials are received by the DECT base station during a time window, and (c) the DECT base station receives the registration allowable DECT device credentials after the locking of the requesting DECT device to the DECT base station and before an end of the time window.

According to an embodiment of the invention stage 510 may include sending, by the trusted DECT device and to the DECT base station, registration allowable DECT devices credentials associated with multiple DECT devices that should be registered by the DECT base station. Stage 530 may include determining to register the requesting DECT device to the DECT base station if the requesting DECT device credentials match one of the registration allowable DECT devices credentials; and determining not to register the requesting DECT device to the DECT base station if the requesting DECT device credentials differs from each one of the registration allowable DECT devices credentials.

Figure 6:
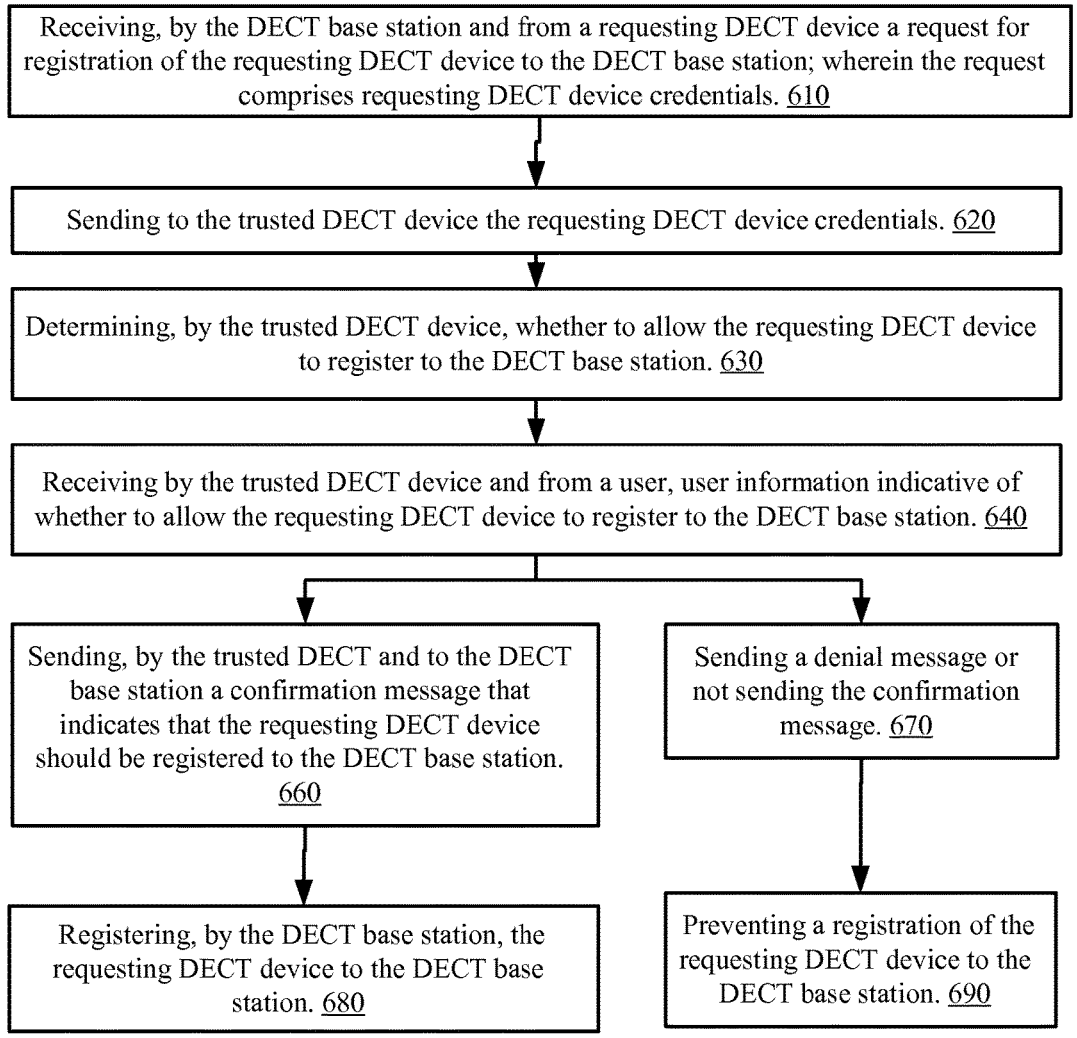
FIG. 6 illustrates a method according to an embodiment of the invention.

FIG. 6 illustrates method 600 according to an embodiment of the invention.

Method 600 may start by stage 610 of receiving, by the DECT base station and from a requesting DECT device a request for registration of the requesting DECT device to the DECT base station; wherein the request comprises requesting DECT device credentials.

Stage 610 may be followed by stage 620 of sending to the trusted DECT device the requesting DECT device credentials.

Stage 620 may be followed by at least one stage out of stages 630 and 640.

Stage 630 may include determining, by the trusted DECT device, whether to allow the requesting DECT device to register to the DECT base station.

Stage 640 may include receiving by the trusted DECT device and from a user, user information indicative of whether to allow the requesting DECT device to register to the DECT base station.

If it is determined (by the user or by the trusted DECT device) to allow the registration of the requesting DECT device at the DECT base station then stages 630 and 640 are followed by stage 660 of sending, by the trusted DECT and to the DECT base station a confirmation message that indicates that the requesting DECT device should be registered to the DECT base station.

If it is determined (by the user or by the trusted DECT device) not to allow the registration of the requesting DECT device at the DECT base station then stages 630 and 640 are followed by stage 670 of sending a denial message or not sending the confirmation message.

Stage 660 may be followed by stage 680 of registering, by the DECT base station, the requesting DECT device to the DECT base station.

Stage 670 may be followed by stage 690 of preventing a registration of the requesting DECT device to the DECT base station.

Figure 7:
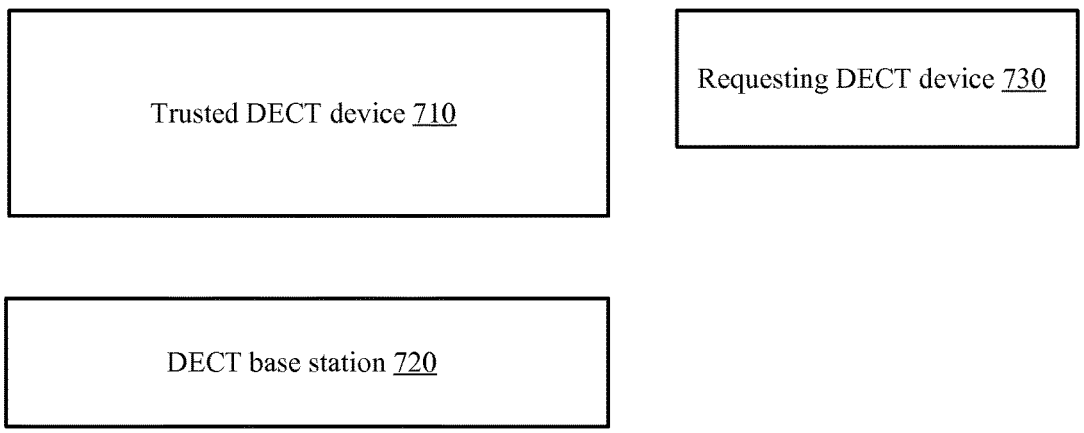
FIG. 7 illustrates a system according to an embodiment of the invention.

FIG. 7 illustrates a system 700 according to an embodiment of the invention.

System 700 may include a trusted DECT device 710 and a DECT base station 720.

The trusted DECT device 710 may be arranged to send, to the DECT base station 720, registration allowable DECT device credentials.

The DECT base station 720 may be arranged to (a) receive from a requesting DECT device 730 a request for registration of the requesting DECT device 730 to the DECT base station. The request include requesting DECT device 730 credentials; (b) register the requesting DECT device 730 to the DECT base station 720 if the requesting DECT device 730 credentials match the registration allowable DECT device credentials; and (c) prevent a registration of the requesting DECT device 730 to the DECT base station 720 if the requesting DECT device 730 credentials differ from the registration allowable DECT device credentials.

The trusted DECT device 710 may be, for example, (a) a DECT mobile phone that is registered to the DECT base station, or (b) a plug-in DECT device that is coupled to the DECT base station.

According to an embodiment of the invention the registration process can define a time window during which the registration process or parts of the registration process should be completed. This increases the security level of the registration process. The user can be made aware of the time window DECT by the provision of an alert by the trusted DECT device, the DECT base station and/or the requesting DECT device.

The DECT base station 720 may be arranged to register the requesting DECT device 730 to the DECT base station 720 if (a) the requesting DECT device 730 credentials match the registration allowable DECT device credentials and (b) the requesting DECT device 730 credentials are received by the DECT base station 720 during a time window.

The user can be made aware to the time window or to the need to provide feedback during a certain time frame by providing alerts by the requesting DECT device 730, the DECT base station 720 or the trusted DECT device 710.

The time window may start in response to a signal which is send by the trusted DECT device to the DECT base station. The trusted DECT device sends this signal based on an input from the user.

The requesting DECT device 730 can generate an alert to the user and the user should act within a relatively short time frame.

Accordingly, the DECT base station 720 may be arranged to register the requesting DECT device 730 if (a) the requesting DECT device 730 credentials match the registration allowable DECT device credentials, (b) the requesting DECT device 730 credentials are received by the DECT base station 720 during a time window, and (c) the DECT base station 720 receives the registration allowable DECT device credentials after the locking of the requesting DECT device to the DECT base station and before an end of the time window.

The length of the time window may be determined in response to security needs (shorter time window as possible) but should be long enough to allow the user to respond in a reasonable time period. The duration can be one minute, few seconds, few tenths of a second, few minutes and the like.

The sending of the registration allowable DECT device credentials to the DECT base station can be triggered by a user. The trusted DECT device 710 may be arranged to send, to the DECT base station, the registration allowable DECT device credentials in response to reception of a trigger provided to the trusted DECT device 710 from a user.

The trigger can generated by pressing some keys of a keyboard of the trusted DECT device 710, entering the trigger by using a touch screen of the trusted DECT device 710, sending vocal commands to the trusted DECT device 710, sending the trigger over an out of band channel such as over a non-DECT communication channel (sending an email message, or sending a message over any web-based channel).

The DECT base station 720 may be arranged to transmit a registration mode indicator in response to a reception of the registration allowable DECT device credentials. This registration mode indicator indicates to DECT devices such as requesting DECT device 730 that the DECT base station is ready for registering DECT devices.

According to an embodiment of the invention the trusted DECT device 710 may be arranged to send, to the DECT base station, registration allowable DECT devices credentials associated with multiple DECT devices that should be registered by the DECT base station. Thus, instead of sending DECT device credential of a single DECT device, the trusted DECT device 710 may send registration allowable DECT devices credentials associated with multiple DECT devices.

The registration of these multiple registration allowable DECT devices can be performed during one or multiple registration iterations that may be proximate to each other or be spread apart from each other.

The trusted DECT device 710 may send a list or any other data structure of registration allowable DECT devices and their credentials to the DECT base station.

The DECT base station 720 may be arranged to register the requesting DECT device 730 to the DECT base station 720 if the requesting DECT device 730 credentials match one of the registration allowable DECT devices credentials; and prevent the registration of the requesting DECT device 730 to the DECT base station 720 if the requesting DECT device 730 credentials differs from each one of the registration allowable DECT devices credentials.

According to an embodiment of the invention the DECT base station 720 may be arranged to: receive from a requesting DECT device 730 a request for registration of the requesting DECT device 730 to the DECT base station; wherein the request comprises requesting DECT device 730 credentials; and send to the trusted DECT device 710 the requesting DECT device 730 credentials.

The trusted DECT device 710 may be arranged to send to the DECT base station 720 a confirmation message if it is determined to allow the requesting DECT device 730 to register to the DECT base station.

The DECT base station 720 may be arranged to register the requesting DECT device 730 to the DECT base station 720 in response to a reception of a confirmation message and to prevent a registration of the requesting DECT device 730 to the DECT base station 720 at an absence of a reception of the confirmation message.

The trusted DECT device 710 may be arranged to determine whether to allow the requesting DECT device 730 to register to the DECT base station.

The trusted DECT device 710 may be arranged to receive, from a user, information indicative of whether to allow the requesting DECT device 730 to register to the DECT base station.

In the foregoing specification, the invention has been described with reference to specific examples of embodiments of the invention. It will, however, be evident that various modifications and changes may be made therein without departing from the broader spirit and scope of the invention as set forth in the appended claims.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or module elements or impose an alternate decomposition of functionality upon various logic blocks or module elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system, comprising:
a trusted Digital Enhanced Cordless Telecommunications (DECT) device;
a DECT base station;
a requesting DECT device that differs from the trusted DECT device and differs from the DECT base station;
wherein the requesting DECT device is configured to:
(a) perform a locking of the requesting DECT device to the DECT base station; wherein the locking of the requesting DECT device to the DECT base station comprises finding the DECT base station by the requesting DECT device, listening by the requesting DECT device to beacons of the DECT base station without attempting by the requesting DECT device to register to the DECT base station;
(b) after the locking generate an alert that is perceivable by a user;
(c) count a predefined delay from a generation of the alert before attempting to send to the DECT base station a request for registration of the requesting DECT device to the DECT base station; wherein the request comprises requesting DECT device credentials;
wherein the trusted DECT device is configured to:
  wait to receive a response from the user to the alert;
  based on the response of the user send to the DECT base station, send to the DECT base station, registration allowable DECT device credentials;
wherein the DECT base station is arranged to:
  receive from the requesting DECT device the request for registration of the requesting DECT device to the DECT base station;
  register the requesting DECT device to the DECT base station if the requesting DECT device credentials matches one of the registration allowable DECT device credentials and if the request for the registration of the requesting DECT device was received during a time window that started when the predefined delay expired; and
  prevent a registration of the requesting DECT device to the DECT base station if the requesting DECT device credentials differ from the registration allowable DECT device credentials or if the request for the registration of the requesting DECT device was received outside the time window.

2. The system according to claim 1, wherein the trusted DECT device is a DECT mobile phone that is registered to the DECT base station.

3. The system according to claim 1, wherein the trusted DECT device is a plug-in DECT device that is coupled to the DECT base station.

4. The system according to claim 1, wherein the requesting DECT device is configured to generate the alert to be indicative of a length of the predefined delay.

5. The system according to claim 4, wherein the alert is a visual alert.

6. The system according to claim 4 wherein the alert is a vocal alert.

7. The system according to claim 1 wherein a length of the time window does not exceed 20 seconds.

8. The system according to claim 1, wherein the trusted DECT device is arranged to send, to the DECT base station, the registration allowable DECT device credentials in response to out of band feedback provided to the trusted DECT device from a user.

9. The system according to claim 1, wherein the DECT base station is arranged to transmit a registration mode indicator in response to a reception of the registration allowable DECT device credentials.

10. The system according to claim 1, wherein the trusted DECT device is arranged to send, to the DECT base station, registration allowable DECT devices credentials associated with multiple DECT devices that should be registered by the DECT base station; and
wherein the DECT base station is arranged to:
  register the requesting DECT device to the DECT base station if the requesting DECT device credentials match one of the registration allowable DECT devices credentials; and
  prevent the registration of the requesting DECT device to the DECT base station if the requesting DECT device credentials differs from each one of the registration allowable DECT devices credentials.

11. The system according to claim 1 wherein the response of the user is pressing a key.

12. The system according to claim 11, wherein the trusted DECT device is arranged to determine whether to allow the requesting DECT device to register to the DECT base station.

13. The system according to claim 1 wherein the response of the user is a vocal command.

14. The system according to claim 1, wherein the DECT device is a DECT burglar alarm device.

15. A method, comprising:
  performing a locking of a requesting Digital Enhanced Cordless Telecommunications (DECT) device to a DECT base station; wherein the locking of the requesting DECT device to the DECT base station comprises finding the DECT base station by the requesting DECT device, listening by the requesting DECT device to beacons of the DECT base station without attempting by the requesting DECT device to register to the DECT base station;
  after the locking, generating by the requesting DECT device an alert that is perceivable by a user;
  counting, from the generating of the alert and by the requesting DECT device a predefined delay before attempting to send to the DECT base station a request for registration of the requesting DECT device to the DECT base station; wherein the request comprises requesting DECT device credentials;
  waiting, by a trusted DECT device that differs from the DECT base station and from the requesting DECT device, to receive a response from the user to the alert;
  based on the response of the user send to the DECT base station, sending by the trusted DECT device and to the DECT base station, registration allowable DECT device credentials;
  receiving by the DECT base station the request for registration of the requesting DECT device to the DECT base station;
  registering the requesting DECT device to the DECT base station if the requesting DECT device credentials match one of the registration allowable DECT device credentials and if the request for the registration of the requesting DECT device was received during a time window that started when the predefined delay expired; and
  preventing a registration of the requesting DECT device to the DECT base station if the requesting DECT device credentials differ from the registration allowable DECT device credentials or if the request for the registration of the requesting DECT device was received outside the time window.

16. The method according to claim 15 wherein the alert is indicative of a length of the predefined delay.

17. The method according to claim 15, wherein the DECT device is a DECT burglar alarm device.

18. The method according to claim 15, comprising sending by the trusted DECT device and to the DECT base station, the registration allowable DECT device credentials in response to out of band feedback provided to the trusted DECT device from a user.

19. The method according to claim 15, comprising transmitting by the DECT base station a registration mode indicator in response to a reception of the registration allowable DECT device credentials.

20. The method according to claim 15, comprising:
sending by the trusted DECT device to the DECT base station, registration allowable DECT devices credentials associated with multiple DECT devices that should be registered by the DECT base station;
registering by the DECT base station, the requesting DECT device to the DECT base station if the requesting DECT device credentials match one of the registration allowable DECT devices credentials; and
preventing by the DECT base station, the registration of the requesting DECT device to the DECT base station if the requesting DECT device credentials differs from each one of the registration allowable DECT devices credentials.

21. The method according to claim 15, wherein the response of the user is pressing a key.

22. The method according to claim 21, comprising determining by the trusted DECT device whether to allow the requesting DECT device to register to the DECT base station.

23. The method according to claim 15, wherein the response of the user is a vocal command.

* * * * *